United States Patent [19]
Court

[11] 3,972,345
[45] Aug. 3, 1976

[54] PILOT OPERATED RELIEF VALVE
[75] Inventor: Kenneth Court, Birmingham, Mich.
[73] Assignee: Sperry Rand Corporation, Troy, Mich.
[22] Filed: May 27, 1975
[21] Appl. No.: 581,015

[52] U.S. Cl. ............................................. 137/490
[51] Int. Cl.² ........................................ F16K 31/12
[58] Field of Search .................... 137/489, 490, 491

[56] References Cited
FOREIGN PATENTS OR APPLICATIONS
1,251,906  12/1960  France .............................. 137/490

*Primary Examiner*—Henry T. Klinksiek
*Attorney, Agent, or Firm*—Theodore Van Meter

[57] ABSTRACT

A pilot operated fluid pressure relief valve has a main valve operable by opposed piston areas, both normally exposed to inlet pressure whenever that is below the maximum pressure setting of the valve. A pressure responsive pilot valve is exposed to inlet pressure through a restricted path and when open, exhausts fluid from the piston area which holds the main valve closed. The restricted pathway contains two laminar flow orifices one of which is between the inlet and the valve closing piston area and the other is between the valve closing piston area and the outlet through the pilot valve. This arrangement provides good damping of oscillations, while minimizing any changes in effective opening pressure which are otherwise caused by the use of a single laminar flow orifice for damping purposes.

2 Claims, 1 Drawing Figure

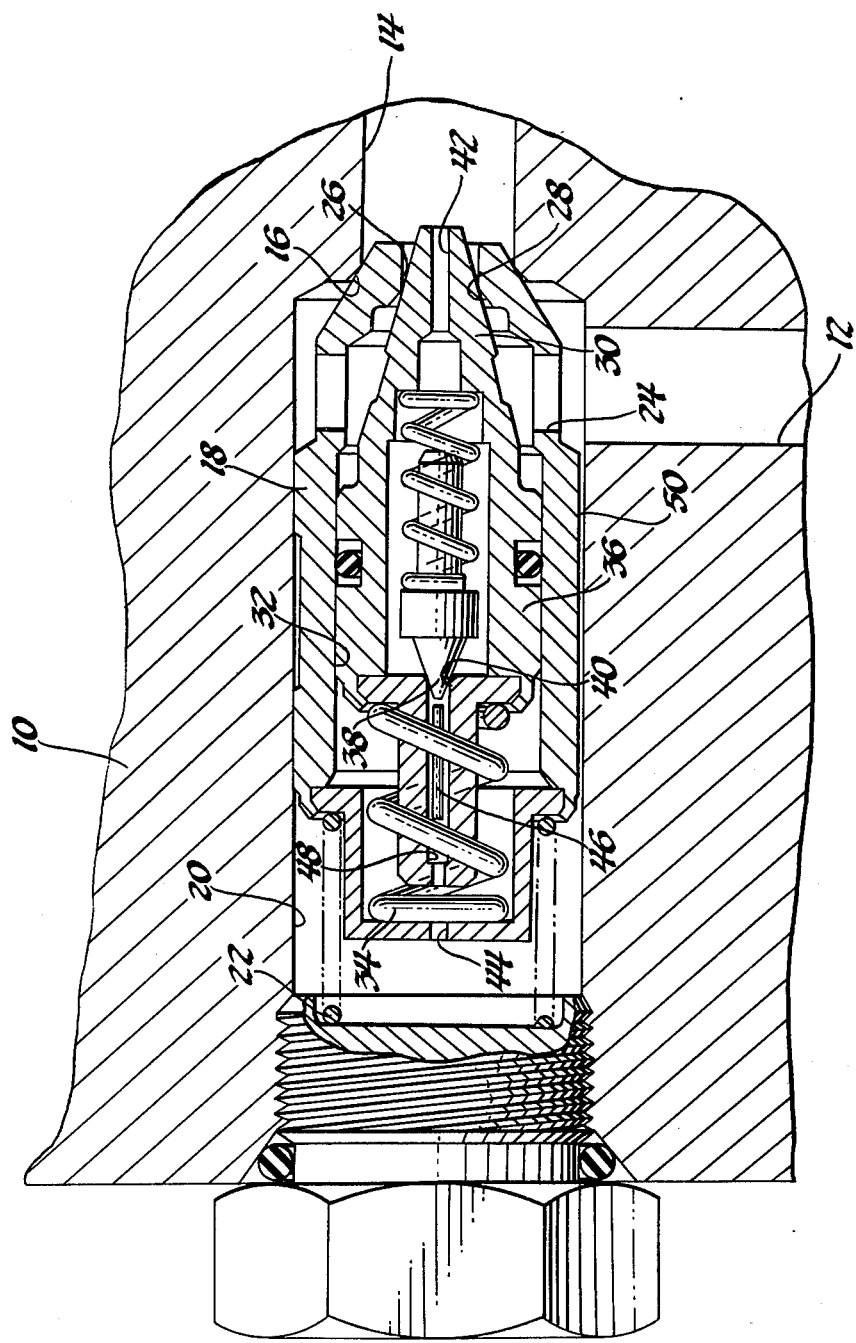

PILOT OPERATED RELIEF VALVE

In the design of pilot operated pressure relief valves such as are conventionally used in hydraulic power transmission equipment, efforts to design a compact low cost valve for use at higher pressures such as 4,000 or 5,000 pounds per square inch create problems of noise, chatter and vibration which result in rapid deterioration of the moving parts. Efforts to dampen the oscillatory movements of the pilot relief valve by the use of a laminar flow orifice at the entrance of the pilot relief valve have been helpful in reducing such vibrations but have introduced disadvantages by way of making the valve much more sensitive to variations in viscosity of the fluid being handled. Thus, the addition of a suitable laminar flow damping restricter causes the valve to have a sharply rising cracking pressure characteristic with normally encountered increases in fluid viscosity such as are experienced in hydraulic systems for equipment to be used outdoors in northern latitudes.

The present invention aims to provide a valve of the character described in which the favorable damping characteristics of the laminar flow orifice may be availed of without incurring the disadvantages heretofore experienced when the fluid being handled has a high viscosity.

This is accomplished by the provision of a pilot operated relief valve comprising a valve body having inlet and outlet passages with a valving orifice between them, a main valve member slidable in the body to open and close the orifice, means forming a first piston area on the main valve member exposed to inlet pressure acting in a valve-opening direction, means forming a second piston area on the main valve member and acting in a valve-closing direction, means biasing the main valve member toward closed position, a pilot relief valve connected to limit pressure acting on the second piston area, means including a first laminar flow orifice between the inlet passage and the second piston area, and a second laminar flow orifice leading from the second piston area to the pilot relief valve, whereby the effects of changes in viscosity of the fluid handled by the relief valve are minimized while at the same time damping oscillatory movements of the pilot relief valve.

IN THE DRAWINGS

The single FIGURE is a cross-sectional view of a pilot operated relief valve incorporating a preferred form of the present invention.

The invention is illustrated as embodied in a combined replenishing check valve and relief valve such as are commonly used in hydraulic power transmissions. The body 10 which may be the body of a pump or a motor or other hydraulic power transmission component, has a high pressure or inlet passage 12 and a low pressure or outlet passage 14 with a valve seat 16 between them. A check valve body 18 is slidable in a bore 20 and urged by a spring 22 toward the seat 16.

The check valve 18 serves as the body for the pilot operated relief valve which is the subject of the present invention and has an inlet passage 24 and an outlet passage 26 with a valving orifice or seat 28 between them. A main relief valve 30 normally closes the seat 28 and slides in a bore 32. The valve 30 is urged toward the right by a biasing spring 34. A piston 36 has an annular area represented by the difference in diameters between seat 28 and bore 32 which is continually exposed to the inlet pressure acting in a direction tending to open the main relief valve. At its left hand side, the piston 36 has its full circular area exposed also to inlet pressure, at times modulated to a lower value, and acting in a valve-closing direction.

A spring loaded pilot relief valve formed by the poppet 38 and the seat 40 act when its setting is exceeded to open and exhaust flow from the left hand side of piston 36 to the outlet 14 through passage 42. Because the flow path from the inlet 12 to the pilot relief valve 38 is a restricted one, about to be described, the opening of pilot relief valve 38 modulates the pressure applied to the left hand face of piston 36 to a value below inlet pressure and thus allows the full inlet pressure acting on the right face of piston 36 to open the main relief valve 30.

An ordinary sharp edged orifice 44, shown exaggerated in size, restricts the rate of flow from the inlet 12 to the left face of piston 36 and is characterized by the production of turbulent flow. This would have a tendency to produce chattering and vibration as flow occurs through the pilot relief valve 38. In order to dampen such vibration and chattering, a loose pin 46 is mounted in the passage 48 to provide a long annular passage just ahead of the pilot relief valve 38. In this passage, the flow is laminar. While such a restriction serves admirably to dampen oscillatory movements of the pilot valve 38, it alone would serve to inhibit the opening of valve 38 at high fluid viscosity until the inlet pressure had risen far above the intended pressure setting. To eliminate this latter effect, the flow path between the inlet 12 and the left face of the piston 36 includes a second laminar orifice provided by a flat 50 formed on the otherwise cylindrical surface of the replenishing valve body 18. The laminar flow orifices 46 and 50 are preferably of substantially equal restrictive effect so that at the higher viscosities, the added resistance imposed by the laminar flow orifice at 46, which carries flow away from the left hand face of piston 36, is substantially balanced by the increased resistance at the laminar flow orifice 50 which carries the flow toward the left face of the piston 36. Thus the effects of changes in viscosity are minimized and the valve operates at substantially the same pressure over a wider range of viscosity.

It will be understood that the present invention may be utilized in applications where a replenishing check valve is not required and in that case the laminar orifice provided by the flat 50 will be replaced by any known form of laminar flow orifice constructed within the stationary body.

What is claimed is:

1. A pilot operated relief valve comprising a valve body having inlet and outlet passages with a valving orifice between them, a main valve member slidable in the body to open and close the orifice, means forming a first piston area on the main valve member exposed to inlet pressure acting in a valve-opening direction, means forming a second piston area on the main valve member and acting in a valve-closing direction, means biasing the main valve member toward closed position, a pilot relief valve connected to limit pressure acting on the second piston area, means including a first laminar flow orifice between the inlet passage and the second piston area, and a second laminar flow orifice leading from the second piston area to the pilot relief valve, whereby the effects of changes in viscosity of the fluid handled by the relief valve are minimized while at the same time oscillatory movements of the pilot relief valve are dampened.

2. A relief valve as defined in claim 1 wherein a turbulent flow orifice is provided between the two laminar flow orifices.

* * * * *